United States Patent
Rothrock et al.

[11] Patent Number: 5,983,263
[45] Date of Patent: Nov. 9, 1999

[54] METHOD AND APPARATUS FOR TRANSMITTING IMAGES DURING A MULTIMEDIA TELECONFERENCE

[75] Inventors: Lewis V. Rothrock, Beaverton; Theresa Alexander, Hillsboro, both of Oreg.

[73] Assignee: Intel Corporation, Santa Clara, Calif.

[21] Appl. No.: 09/002,548

[22] Filed: Jan. 2, 1998

[51] Int. Cl.[6] .................................................. G06F 13/00
[52] U.S. Cl. .......................... 709/204; 345/330; 345/348
[58] Field of Search ..................................... 709/204, 205, 709/206, 207; 345/330, 348

[56] References Cited

U.S. PATENT DOCUMENTS

| | | | |
|---|---|---|---|
| 5,392,223 | 2/1995 | Caci | 709/218 |
| 5,574,934 | 11/1996 | Mirashrafi et al. | 709/207 |
| 5,594,495 | 1/1997 | Palmer et al. | 348/17 |
| 5,689,800 | 11/1997 | Downs | 455/5.1 |
| 5,764,235 | 6/1998 | Hunt et al. | 345/428 |

Primary Examiner—Zarni Maung
Assistant Examiner—Kenneth R. Coulter
Attorney, Agent, or Firm—Blakely, Sokoloff, Taylor & Zafman LLP

[57] ABSTRACT

A method and apparatus are provided for transmitting images from a first processing system to a second processing system over a communication link during a multimedia teleconference. In response to a user input at the first processing system requesting transmission of the image, a communication device in the first processing system is queried for the current bandwidth of the communication link. The communication device returns an indication of the current bandwidth, and in response to the indication, a subset of an image file is selected. The subset corresponds to one of multiple possible levels of resolution of the image. The selected subset of the image file is then transmitted to the second processing system over the communication link, such that the second processing system can display the image at full size, but at a resolution less than the full resolution if necessary, given the current bandwidth.

30 Claims, 5 Drawing Sheets

METHOD AND APPARATUS FOR TRANSMITTING IMAGES DURING A MULTIMEDIA TELECONFERENCE

FIELD OF THE INVENTION

The present invention pertains to the field of multimedia teleconferencing. More particularly, the present invention relates to transmission of images during a multimedia teleconference.

BACKGROUND OF THE INVENTION

Multimedia teleconferencing provides a way for people at distant locations to simulate a live, face-to-face meeting and commonly involves the two-way, real-time transmission of audio, video, an other data between two or more participating sites. Generally, a computer, video camera, and speaker are employed at each site participating in a video conference. Teleconferencing software executing on each computer manages the equipment and the conferencing session. The session is often interactive in that it allows participants to make changes to documents that others can see in real-time. A windows-based graphical user interface is often employed so that live video can be seen by a user in one window, while other computer-generated images are displayed in other windows. The participating computer systems may be connected by any of various types of communication links, such as conventional telephone lines, otherwise known as Plain Old Telephone Service (POTS), a local area network (LAN), or Integrated Services Digital Network (ISDN) connections.

One problem that is associated with multimedia teleconferencing relates to the transfer of images between participating sites, such as during "white board" image sharing. Specifically, image files are often very large and require a large amount of bandwidth to transmit from one computer system to another. As a result, transmission of an image from one computer system to another often consumes an undesirably large amount of time, during which the transmitting system, the receiving system, or both may be unable to perform other tasks or may be noticeably slowed down. In addition, transmission of a large image file may adversely impact the quality of associated audio and video transmissions by consuming available bandwidth. These factors can undesirably extend the duration of a teleconference and detract from the usefulness and enjoyment of a teleconference for the participants. In addition, awareness the above factors may cause a teleconference participant to be overly selective about transmitting images to other participants, which may further limit the effectiveness of the teleconference.

Moreover, it may be difficult for a conference participant to predict whether transmission of an image will have any of the foregoing undesirable effects and, if so, to what extent. The transfer of a large image file may occur within a very reasonable amount of time when the available bandwidth is high but consume an unacceptably long amount of time when the available bandwidth is low, such as during peak usage hours. Consequently, a participant's decision whether to transmit an image may be little more than an educated guess, based perhaps on knowledge of the image file size and an estimate of the currently available bandwidth. The result is often the incorrect decision from the point of view of at least one participant. Hence, what is needed is a technique for increasing the perceived bandwidth of a data communication link between computer systems, so as to allow for improved transfer of images in various applications, such as multimedia teleconferencing.

SUMMARY OF THE INVENTION

The present invention includes a method of transmitting an image from a first processing system to a second processing system over a communication link. The image is represented by a set of data. In the method, an indication is received of a current capacity of the communication link, and only a portion of the set of data representing the image is selected, based on the indication. The selected portion represents the image at a resolution lower than the full resolution. The selected portion of the set of data is then transmitted to the second processing system over the communication link. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for transmitting images from one processing system to another during a multimedia teleconference are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

The present invention allows a desirable balance to be achieved between image quality and image transfer time when an image is transmitted from one computer system to another, such as during a multimedia teleconference, given the bandwidth available at the time. A user may perceive the effect as an increase in overall bandwidth. Briefly, in accordance with the present invention, a user input is received by a local processing system requesting transmission of an image to a remote processing system. In response, a communication device of the local processing system is queried to determine the current bandwidth of the communication link between the two systems. Based on the response to the query, a subset of an image file is automatically selected by the local processing system. The subset corresponds to one of multiple selectable resolutions of the same image. The selected subset of the image file is transferred to the remote processing system, where the image is displayed at full size, but possibly at a resolution less than full resolution, depending on the selected subset. Selection of the appropriate subset of the image file is made in a manner that is transparent to the user of either the local processing system or the remote processing system. However, a user may provide criteria upon which such selections are made, such as a desired balance between image quality and image transfer time.

Figure 1:
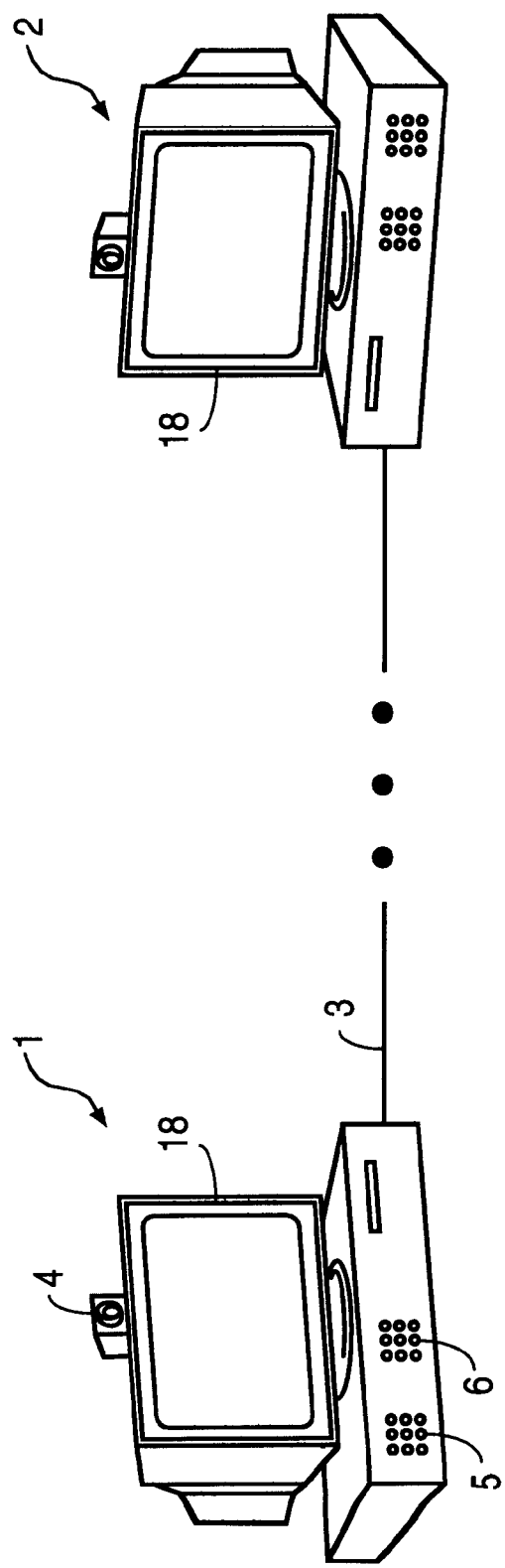
FIG. 1 illustrates two computer systems connected for a multimedia teleconference.

FIG. 1 illustrates two computer systems 1 and 2 connected to carry out a multimedia teleconferencing session. Note that computer systems 1 and 2 may be connected to each other and possibly to other computer systems through a multipoint conferencing unit (not shown) or other similar device. Each of the computer systems 1 and 2 includes a display device 18, a video camera 4, a microphone 5, and a speaker. Computer systems 1 and 2 are connected to each other by a communication link 3, which may be POTS lines, ISDN connections, digital subscriber line (xDSL) connections, Ethernet connections, or any other suitable type of communication link.

Computer systems 1 and 2 each include and execute appropriate multimedia teleconferencing application software. An example of such software is the Intel ProShare video conferencing system available from Intel Corporation of Santa Clara, Calif. It should be noted that a number of standards relate to multimedia teleconferencing, with which the teleconferencing application software may comply. For example, International Telecommunications Union (ITU) standard T.120 covers document conferencing in a multimedia teleconference. Document conferencing may include data sharing among participants, including "white board" image sharing, graphic display information, and image exchange. The video spect of a multimedia conference may be governed by, for example, ITU standard H.320, which defines multipoint video conferencing over circuit switched media; ITU standard H.323, which defines video communication on LANs; or ITU standard H.324, which is directed to video and audio communication using POTS.

Figure 2:
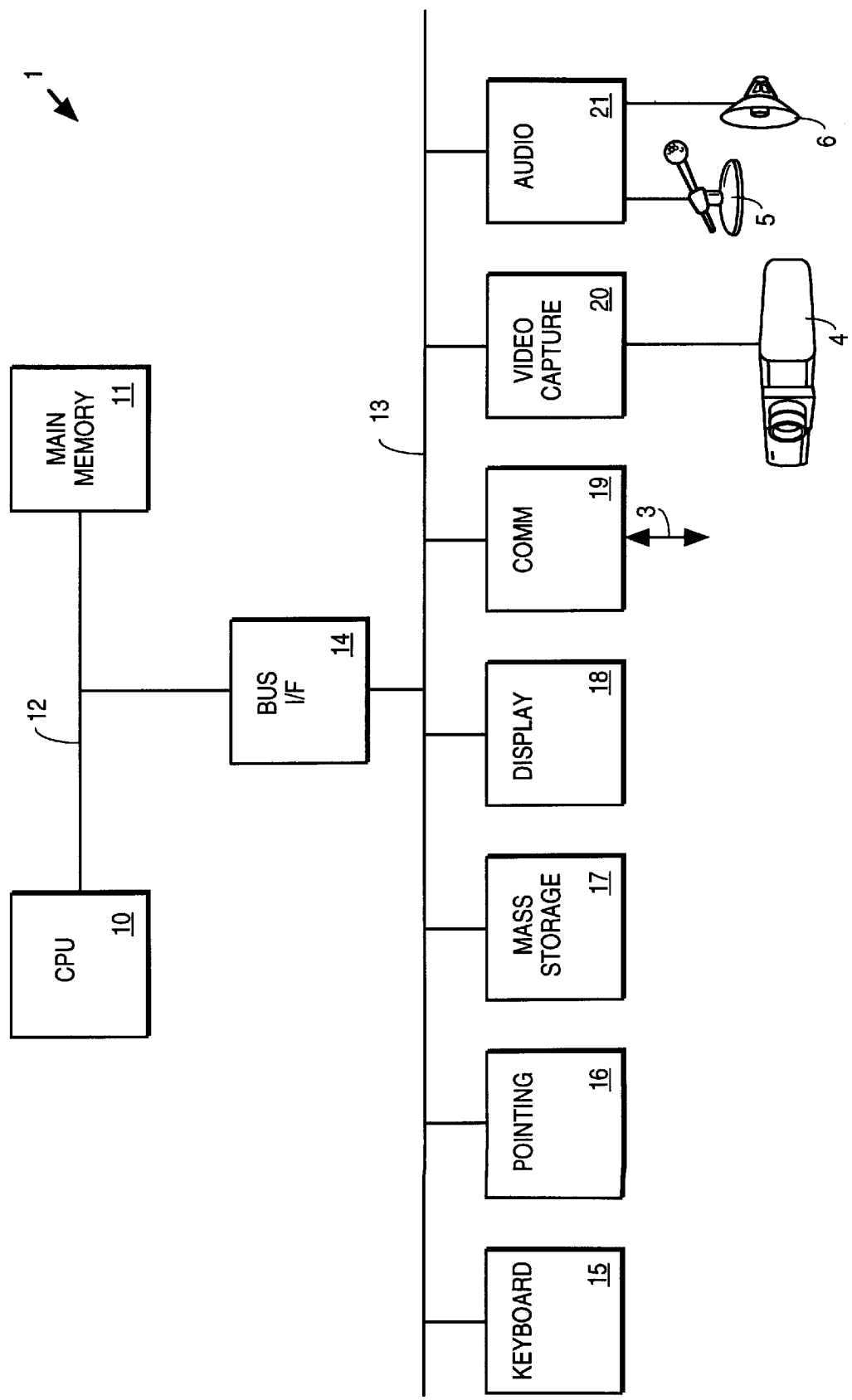
FIG. 2 illustrates a computer system in which the present invention can be implemented.

FIG. 2 is a block diagram of computer system 1. For purposes of describing the present invention, computer system 2 may be assumed to be essentially identical to computer system 1. Computer system 1 includes a Central Processing Unit (CPU) 10 connected to main memory 11 by a system bus 12. Main memory 11 includes Random Access Memory (RAM) and may also include Read-Only Memory (ROM). The system bus 12 is coupled to a peripheral bus 13 via a bus interface 14. The bus interface 14 may include any of a number of well-known bridges, controllers, and/or adapters for linking buses 12 and 13, and for enabling the components of computer system 1—1 to communicate with each other. The peripheral bus 13 may be any of a number of well-known expansion buses, an example of which is the Peripheral Component Interconnect (PCI) bus.

A number of components are connected to the peripheral bus 13, including a keyboard 15, a pointing device 16, a mass storage device 17, the display device 18, and a communication device 19. The pointing device 16 may be any device suitable for enabling a user to position a pointer on the display device 18, such as a mouse, a trackball, or a touchpad. The mass storage device 17 may include any device suitable for storing large volumes of data, such as a magnetic disk or tape, a magneto-optical (MO) storage device, or any of numerous variations of Compact Disk (CD) based storage device (e.g., CD-ROM, CD-R, CD-RW) or Digital Versatile Disk (DVD) based storage device. The communication device 19 may be any device suitable for enabling the computer system 1—1 to communicate audio, video and other data with remote computer systems via link 3. Accordingly, communication device 19 may be, for example, a conventional modem, an ISDN adapter, an xDSL adapter, or an Ethernet adapter.

The video camera 4 is also coupled to the peripheral bus 13 via a video capture board 20. Similarly, the microphone 5 and speaker 6 are coupled to bus 13 via audio circuitry 21. Circuits 20 and 21 provide appropriate circuitry for interfacing the video and audio input/output components to the bus 13, such as analog-to-digital and digital-to-analog conversion, compression and decompression, and other standard functions which are well-known in the art.

It will be noted that the architecture illustrated in FIG. 2 is provided only for purposes of illustration and that numerous variations on this architecture can be used within the scope of the present invention. For example, in other embodiments some or all of the components shown as connected to the peripheral bus 13 might instead be connected to the computer system 1 on a Universal Serial Bus (USB) or a bus which conforms to the Institute of Electrical and Electronics Engineers (IEEE) standard known as "IEEE 1394-1995 Standard for a High-Speed Performance Serial Bus" (otherwise known as "IEEE 1394"). Such a bus may replace or supplement bus 13 in computer system 1—1.

The present invention may be carried out in computer system 1, for example, in response to its CPU 10 executing sequences of instructions contained in memory. The instructions may be executed from RAM 11 and may be loaded into RAM 11 from a persistent store, such as mass storage device 17 and/or from one or more other remote computer systems (collectively referred to as "host computer system"). In particular, a host computer system may transmit a sequence of instructions to computer system 1 in response to a message transmitted to the host computer system over a network by computer system 1. As computer system 1 receives the instructions via the network connection 3, computer system 1 stores the instructions in memory. Computer system 1 may store the instructions for later execution or execute the instructions as they arrive over the network.

In some cases, the downloaded instructions may be directly supported by the CPU 10 of computer system 1. Consequently, execution of the instructions may be performed directly by the CPU 10. In other cases, the instructions may not be directly executable by the CPU 10. Under those circumstances, the instructions may be executed by causing the CPU 10 to execute an interpreter that interprets the instructions or by causing the CPU 10 to execute instructions which convert the received instructions to instructions which can be directly executed by the CPU 10.

In other embodiments, hardwired circuitry may be used in place of, or in combination with, software instructions to implement the present invention. Thus, the present invention is not limited to any specific combination of hardware circuitry and software, nor to any particular source for the instructions executed by a computer system. Note that the present invention can also be implemented in like manner in computer system 2 or in any other suitable computer system.

Figure 3:
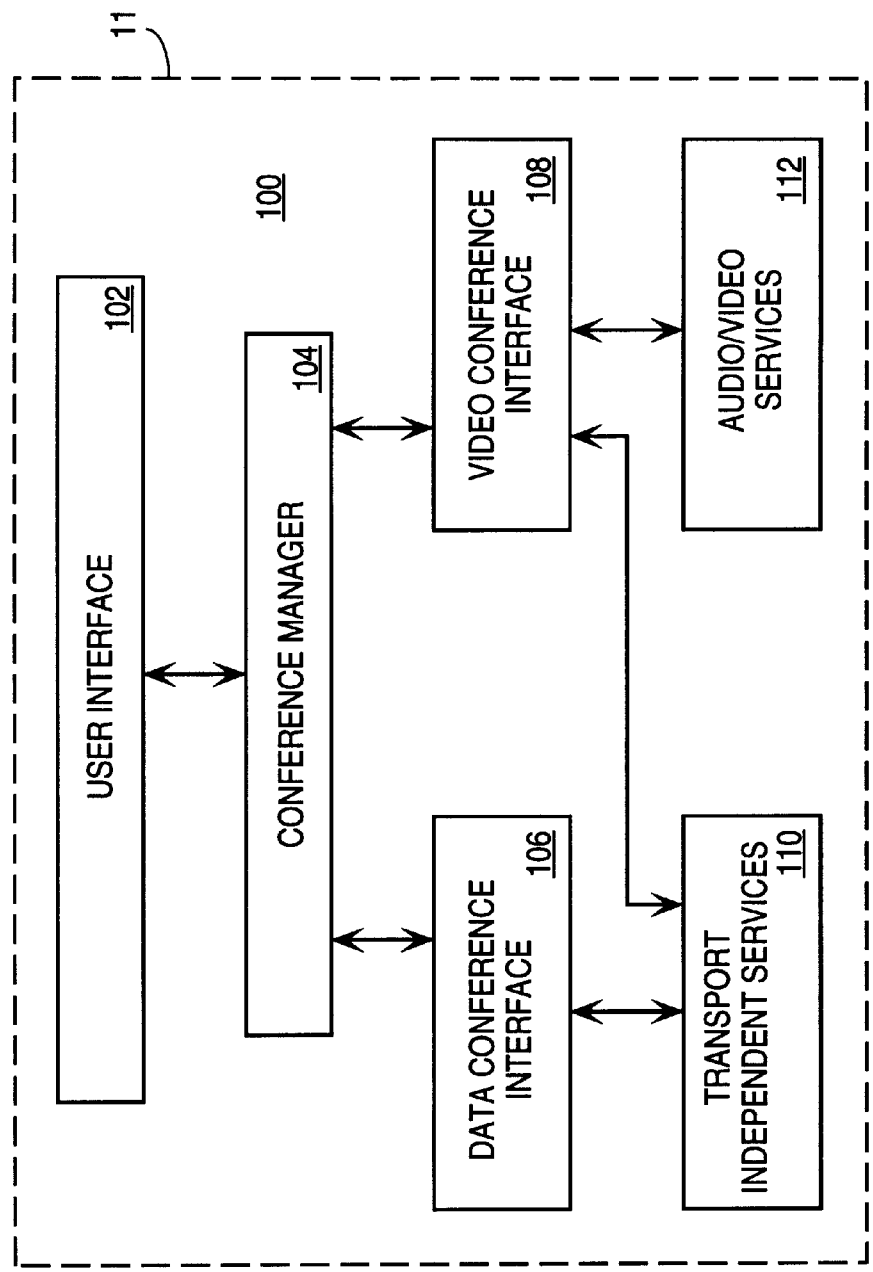
FIG. 3 illustrates a multimedia teleconferencing application according to one embodiment.

FIG. 3 illustrates an example of a multimedia teleconferencing software application in which the present invention can be embodied. The application may be stored in main memory 11, as shown, or from mass storage device 17, another suitable storage device or a combination of storage devices. The teleconferencing application 100 includes a graphical user interface 102, conference manager 104, transport independent services 110, extended audio visual (A/V) services 112, and "integrated" data and video interfaces 106 and 108 to these services 110 and 112, respectively.

User interface 102 provides display windows with menus, buttons, etc., for interacting with the user. Conference manager 104 manages personal conferences including connection and termination services. Transport independent services 110 provide connection services on multiple transport media and multiple connections. A/V services 112 provide sampling, digitization, compression/decompression of audio signals exchanged, as well as capture and playback services for video streams, including interfacing with the proper coder/decoder (CODEC) to compress and decompress the signals. Integrated services 106 and 108 provide abstraction of these transport and A/V services enabling the serviced conferencing application to perform call management, data, and/or file channel management and A/V streams management. In one embodiment, dataconferencing interface 106 supports the ITU standard T.120 protocol. Videoconferencing interface 108 may support the ITU standard H.320 protocol. These and other related services are well-known in the art and therefore will not be described in further detail.

As noted above, the present invention allows a desirable balance between image quality and image transfer time to be achieved when an image is transmitted from one computer system to another, given the bandwidth available at the time. This result may be accomplished, in part, by storing an image at multiple levels of resolution or by decimating the image to an appropriate resolution. When a request is made by a user to transmit the image to a remote computer system, the appropriate level of resolution is selected in view of the current bandwidth and the image is transmitted at the selected level of resolution. More specifically, the data communication device of the transmitting computer system is queried automatically for the current bandwidth in response to the request. Selection of the appropriate image resolution is made automatically based on an indication of the current bandwidth returned by the communication device in response to the query. The image is then transmitted to the remote system at the selected level of resolution.

Note that numerous conventional modems and other conventional data communication devices provide the capability to return an indication of the current bandwidth in response to such a query. If desired the selection may be a function of user entered criteria. For example, the user may enter, at the beginning of a teleconference, a value indicating a desired balance between image quality and image transfer time. Such a value may be input, for example, using a sliding control or other similar device displayed on display device 18 by graphical user interface 102. Alternatively, a default value may be used.

Figures 4A, 4B:
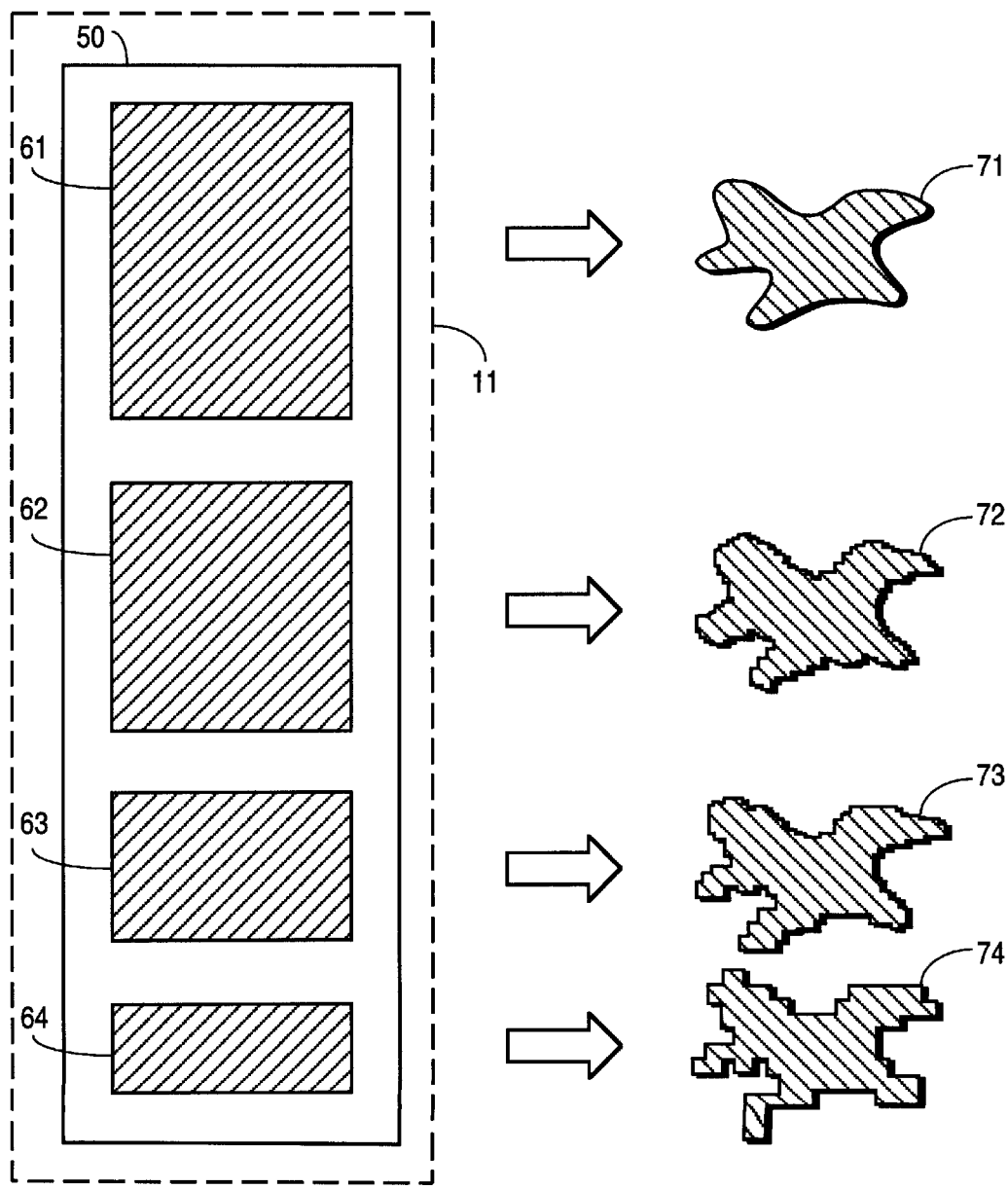
FIG. 4A illustrates an image displayed on a display device at full resolution.
FIG. 4B illustrates a file having a number of subsets, each corresponding to the image of FIG. 4A at a different resolution.

Referring now to FIG. 4A, an object 70 is illustrated. The user of computer system 1 may wish to transmit an image of object 70 to computer system 2 to enable the user of computer system 2 to view the image. Referring therefore to FIG. 4B, an image file 50 representing object 70 may be stored in memory 11, as shown, or in any other suitable storage device. The image file 50 includes several subsets 61, 62, 63 and 64, each of which includes data for representing object 70 as an image at a different level of resolution. For example, subset 61 is for generating image 71 representing object 70 at full resolution. Subsets 62 through 64 are for generating images 72 through 74, respectively, representing object 70 at various different lower levels of resolution.

Techniques are known in the art for storing an image at multiple levels of resolution in a single file. For example, the FlashPix file format, developed by Eastman Kodak Company, Hewlett-Packard Company, Live Picture, Inc., and Microsoft Corp., stores images at multiple independent resolutions. Each resolution is subdivided into square tiles. Another file format which may be suitable for use with the present invention is the Photo CD format of Eastman Kodak Company, which is particularly suited for processing photographic images and which also stores images at multiple levels of resolution.

Figure 5:
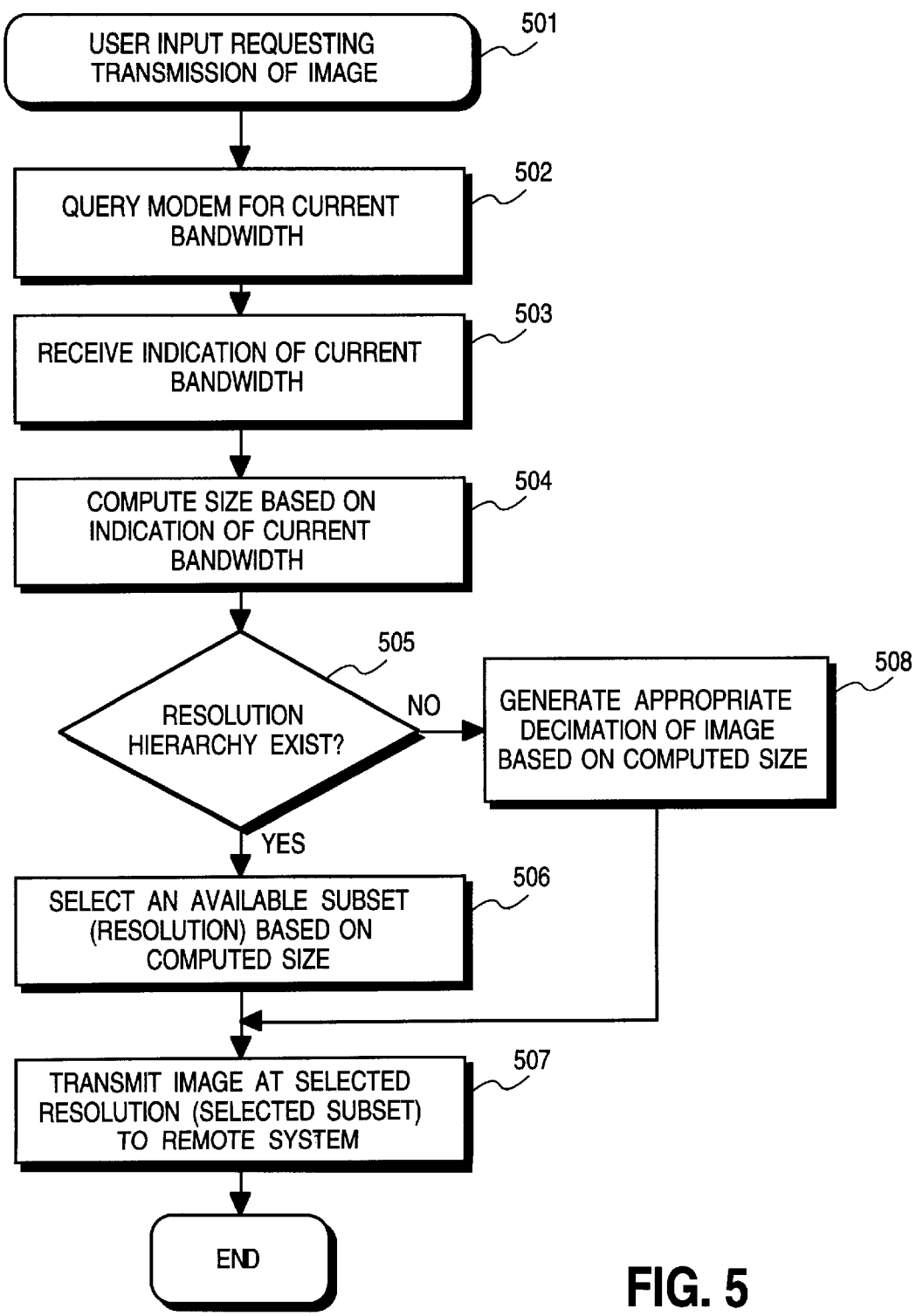
FIG. 5 is a flow diagram illustrating a routine for transmitting an image from one processing system to another in accordance with the present invention.

FIG. 5 illustrates a routine for transmitting an image from one processing system to another in accordance with the present invention. In step 501, a user input requesting transmission of an image is received by a local processing system, such as computer system 1 in FIG. 1. As noted above, the image is represented by a file, such as file 50 in FIG. 4B, in which the image is represented at multiple levels of resolution. In step 502, the local processing system automatically queries its modem or other communication device for the current bandwidth of its communication link with the remote processing system. As noted above, the communication device may be a conventional modem, an ISDN adapter, an xDSL adapter, an Ethernet adapter, or any other suitable communication device. In step 503, the local processing system receives an indication of the current bandwidth in response to the query. In step 504, the local processing system computes a file size based upon the indication of the available bandwidth returned by the communication device. More specifically, the computation of step 504 may be a computation of the largest file size which should be transmitted in view of the current bandwidth and any user specified criteria or default criteria relating to the maximum allowable transfer time. Note that the user input criteria or default criteria may be varied to achieve a particular balance between image transfer time and image quality. Also, other parameters can be used as well to compute the size, and various weighting schemes can be employed in the computation.

Following step 504, if a resolution hierarchy exists at step 505 (e.g., in the form of a FlashPix file), then in step 506 the local processing system selects one of the multiple levels of resolution of the image based on the computed size. For example, referring again to in FIG. 4B, the local computer system may select one of subsets 61 through 64 of image file 50. If a resolution hierarchy does not exist at step 505, then in step 508 the local processing system generates the appropriate image decimation based on the computed file size. Following step 506 or 508, the local computer system transmits the image at the selected resolution to the remote processing system in step 507. More specifically, the local processing system transmits to the remote computer system the subset of the image file (generated based on the resolution hierarchy or the decimation) corresponding to the selected resolution.

When the transmitted subset is received by the remote processing system, the entire image can be displayed on the remote processing system at full size, although the image may be displayed at a lower resolution than that displayed on the local processing system, if necessitated by the current bandwidth. Note that the display of the image at full size in the remote processing system is in contrast to other image processing techniques in which a lower level of resolution is used to display a "thumbnail" (reduced size) image of the original image. Hence the transfer of images between processing systems is improved by the present invention.

Thus, a method and apparatus for transmitting images from one processing system to another during a multimedia teleconference have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of communicating an image between a first processing system and a second processing system connected to each other by a communication link, the method comprising:

receiving from a communication device an indication of a bandwidth of the communication link, the communication device for communicating data over the communication link;

selecting one of a plurality of subsets of a file representing the image based on the indication of the bandwidth of the communication link, each of the subsets corresponding to one of a plurality of resolutions; and transmitting the selected subset of the file to the second processing system over the communication link.

2. A method according to claim 1, wherein the selected subset is less than the entire file, and wherein the selected subset represents the entire image at a resolution lower than a full resolution.

3. A method according to claim 2, further comprising:

receiving the selected subset of the file at the second processing system; and using the selected subset to display, on a display device at the second processing system, the entire image at the resolution lower than the full resolution.

4. A method according to claim 1, further comprising:

displaying the image at a first size on a display device of the first processing system;

receiving the selected subset at the second processing system in response to transmitting the selected subset; and using the selected subset to display, on a display device of the second processing system, the entire image at the first size and at a resolution lower than the full resolution.

5. A method according to claim 1, further comprising:

receiving user input for causing transfer of the image from the first processing system to the second processing system; and automatically querying the communication device for the bandwidth in response to receiving the user input, such that said receiving of the indication of the bandwidth is in response to said querying.

6. A method according to claim 1, wherein selecting one of a plurality of subsets of the file based on the indication of the bandwidth comprises automatically selecting said one of a plurality of subsets of the file, in response to receiving the indication of the bandwidth.

7. A method according to claim 1, wherein transmitting the selected subset of the file to the second processing system comprises transmitting the selected subset during a teleconference compliant with International Telecommunications Union (ITU) standard T.120.

8. A method of transmitting an image from a first processing system to a second processing system over a communication link, the image represented by a set of data, the method comprising:

receiving an indication of a current capacity of the communication link;

automatically selecting only a portion of the set of data representing the image, based on the indication of the current capacity of the communication link, the portion representing the image at a resolution lower than a full resolution; and transmitting the selected portion of the set of data to the second processing system over the communication link.

9. A method according to claim 8, wherein automatically selecting only a portion of the set of data representing the image comprises automatically selecting one of a plurality of selectable portions of the set of data, each of the selectable portions of the set of data representing the image at a different resolution.

10. A method according to claim 8, wherein automatically selecting only a portion of the set of data representing the image comprises decimating the set of data representing the image.

11. A method according to claim 8, further comprising:

receiving user input for requesting transfer of the image from the first processing system to the second processing system; and in response to the user input, automatically querying a communication device for the current capacity, such that said receiving an indication of the current capacity is in response to said querying.

12. A method according to claim 8, further comprising:

receiving the selected portion of the set of data at the second processing system; and using the selected portion to display, on a display device of the second processing system, the entire image at the resolution lower than the full resolution.

13. A method according to claim 8, further comprising:

displaying the image at a full size on a display device of the first processing system;

receiving the selected portion of the set of data at the second processing system in response to transmitting the selected portion; and using the selected portion to display, on a display device of the second processing system, the entire image at the full size but at a resolution lower than the full resolution.

14. A method according to claim 8, wherein transmitting the selected portion of the set of data to the second processing system over the communication link comprises transmitting the selected portion during a teleconference according to International Telecommunications Union (ITU) standard T.120.

15. In a local processing system, a method of transferring an image to a remote processing system connected to the local processing system by a communication link, the local processing system including a communication device for communicating data over the communication link, the method comprising:

receiving user input for initiating transfer of the image from the local processing system to the remote processing system;

automatically querying the communication device for a current bandwidth of the communication link in response to the user input;

receiving from the communication device and indication of the current bandwidth of the communication link in response to said querying;

automatically determining an image size based on the received indication of the current bandwidth of the communication link;

selecting only a portion of a file representing the image based on the image size, the portion corresponding to one of a plurality of resolutions associated with the image, the file including a plurality of portions each corresponding to a different one of the plurality of resolutions; and using the communication device to transmit the selected portion of the file to the remote processing system.

16. A method according to claim 15, wherein said portion represents the entire image at a resolution lower than a full resolution.

17. A method according to claim 16, further comprising displaying the image in the local processing system at a full size, wherein the image is for display by the remote processing system at the full size but at the resolution lower than the full resolution.

18. A method according to claim 15, wherein using the communication device to transmit the selected portion to the remote processing system comprises transmitting the selected portion during a teleconference according to International Telecommunications Union (ITU) standard T.120.

19. A processing system comprising:

a processor;

a communication device coupled to the processor for communicating data over a communication link;

a first storage unit coupled to the processor, the first storage unit having stored therein an image file representing an image;

a second storage unit coupled to the processor, the second storage unit having stored therein sequences of instructions which, when executed by the processor, cause the processing system to:

receive user input requesting transmission of the image from the processing system to a second processing system;

automatically query the communication device for a current channel capacity of the communication link in response to receiving the user input;

receive from the communication device an indication of the current channel capacity of the communication link in response to the query;

select one of a plurality of subsets of the image file based on the indication, each of the subsets corresponding to one of a plurality of resolutions; and transmit the selected subset of the image file to a second processing system over the communication link using the communication device.

20. A processing system according to claim 19, wherein the selected subset is less than the entire image file, and wherein the selected subset represents the entire image at a resolution lower than a full resolution.

21. A processing system according to claim 20, further comprising:

a display device coupled to the processor;

wherein the sequences of instructions further comprise instructions which, when executed by the processor, cause the processing system to display the image at a first size on the display device, and wherein the image is for display by the second processing system at the first size but at the resolution lower than the full resolution.

22. A processing system according to claim 19, wherein selecting one of a plurality of subsets of the file based on the indication of the bandwidth comprises automatically selecting said one of a plurality of subsets of the file, in response to receiving the indication of the current channel capacity.

23. A processing system according to claim 19, wherein transmitting the selected subset of the file to the second processing system comprises transmitting the selected subset over the communication link during a teleconference compliant with International Telecommunications Union (ITU) standard T.120.

24. An apparatus for transmitting an image from a first processing system to a second processing system over a communication link, the image represented by a set of data, the method comprising:

means for receiving an indication of a current bandwidth of the communication link;

means for automatically selecting only a portion of the set of data representing the image based on the indication of the current bandwidth of the communication link, the portion representing the image at a resolution lower than a full resolution; and means for transmitting the selected portion of the set of data to the second processing system over the communication link.

25. An apparatus according to claim 24, wherein the means for automatically selecting only a portion of the set of data representing the image comprises means for automatically selecting one of a plurality of selectable portions of the set of data, each of the selectable portions of the set of data representing the image at a different resolution.

26. An apparatus according to claim 24, wherein the means for automatically selecting comprises means for decimating the set of data representing the image.

27. An apparatus according to claim 24, further comprising:

means for receiving user input for causing transfer of the image from the first processing system to the second processing system; and means for automatically querying a communication device for the current bandwidth in response to receiving the user input, such that said receiving an indication of the current bandwidth is in response to said querying.

28. An apparatus according to claim 24, further comprising:

means for receiving the selected portion of the set of data at the second processing system; and means for using the selected portion to display, on a display device of the second processing system, the entire image at the resolution lower than the full resolution.

29. An apparatus according to claim 24, further comprising:

means for displaying the image at a full size on a display device of the first processing system;

means for receiving the selected portion of the set of data at the second processing system in response to transmitting the selected portion; and means for using the selected portion to display, on a display device of the second processing system, the entire image at the full size but at a resolution lower than the full resolution.

30. An apparatus according to claim 24, wherein the means for transmitting the selected portion of the set of data to the second processing system over the communication link comprises means for transmitting the selected portion during a teleconference according to International Telecommunications Union (ITU) standard T.120.

\* \* \* \* \*